(12) United States Patent
Zimmerman et al.

(10) Patent No.: US 9,100,196 B2
(45) Date of Patent: Aug. 4, 2015

(54) INTELLIGENT MIDSPAN POE INJECTOR

(75) Inventors: Craig Zimmerman, Austin, TX (US); Chris Bullock, Round Rock, TX (US)

(73) Assignee: Cisco Technology, Inc., San Jose, CA (US)

( * ) Notice: Subject to any disclaimer, the term of this patent is extended or adjusted under 35 U.S.C. 154(b) by 316 days.

(21) Appl. No.: 13/524,611

(22) Filed: Jun. 15, 2012

(65) Prior Publication Data

US 2013/0339760 A1 Dec. 19, 2013

(51) Int. Cl.
*G06F 1/00* (2006.01)
*H04L 12/10* (2006.01)
*G06F 1/26* (2006.01)

(52) U.S. Cl.
CPC . *H04L 12/10* (2013.01); *G06F 1/26* (2013.01)

(58) Field of Classification Search
CPC .......................................... G06F 1/26
USPC .......................................... 713/300
See application file for complete search history.

(56) References Cited

U.S. PATENT DOCUMENTS

| | | | |
|---|---|---|---|
| 7,404,091 B1 * | 7/2008 | Gere | 713/300 |
| 7,770,035 B1 * | 8/2010 | John et al. | 713/300 |
| 7,849,333 B2 * | 12/2010 | Schindler | 713/300 |
| 2006/0082222 A1 * | 4/2006 | Pincu et al. | 307/29 |
| 2007/0038769 A1 * | 2/2007 | Ryan et al. | 709/230 |
| 2007/0223520 A1 * | 9/2007 | Diab | 370/463 |
| 2009/0063874 A1 | 3/2009 | Diab | |
| 2010/0005320 A1 * | 1/2010 | Squillante | 713/300 |
| 2010/0299544 A1 * | 11/2010 | Hansalia | 713/320 |
| 2011/0258465 A1 | 10/2011 | Diab et al. | |

* cited by examiner

*Primary Examiner* — Thomas Lee
*Assistant Examiner* — Volvick Derose
(74) *Attorney, Agent, or Firm* — Patterson & Sheridan, LLP (57) ABSTRACT

Adding a separate communication link between an intelligent midspan Power Source Equipment (PSE) device and a network device (or between the midspan PSE device and a powered device (PD)) enables data communication from the network device to the intelligent midspan PSE device. The communication link provides a communication channel that the intelligent midspan PSE device may use to perform additional functions such as reallocating power, budgeting power, enabling or disabling Power over Ethernet (PoE) for a particular PD, prioritizing PoE management, and the like.

23 Claims, 4 Drawing Sheets

INTELLIGENT MIDSPAN POE INJECTOR

TECHNICAL FIELD

Embodiments presented in this disclosure generally relate to power over Ethernet (PoE), and more particularly to an intelligent midspan device.

BACKGROUND

Ethernet communications provide high speed communications between data terminals. PoE systems enable power transmission over the same transmission lines (i.e., Ethernet cables) that carry data in an Ethernet link. Generally, power is generated at a Power Source Equipment (PSE) side of the PoE system and is carried over an Ethernet cable to a Powered Device (PD) side of the PoE system. IEEE 802.03af defines two types of PSEs: an endspan PSE and a midspan PSE. An endspan PSE is a network device (e.g., switch, routers, and the like) that is PoE enabled—i.e., the network device can facilitate data communication as well as provide DC power to a powered device. Instead of purchasing a new network device that is an endspan PSE, a cheaper option may be to insert a midspan PSE device between a non-PoE enabled network device and the PD. The midspan PSE injects power onto the Ethernet cable coupled to the PD while merely forwarding the data (e.g., Ethernet packets and frames) transmitted between the PD and the network device.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DESCRIPTION

Overview

Embodiments presented in this disclosure include a midspan device for providing power over Ethernet to a powered device. The midspan device includes a first Ethernet port configured to couple to a first Ethernet cable. Moreover, the first Ethernet cable couples the midspan device to a network device that transmits only data to the midspan device. The midspan device also includes a second Ethernet port configured to couple to a second Ethernet cable that couples the midspan device to a powered device. The midspan device includes a communication port configured to communicatively couple the midspan device to at least one of the network device and the powered device. The midspan device also includes a power supply configured to provide power via the second Ethernet port to the powered device. The power supply is configured to receive a request via the communication port and allocate power to the powered device based on a specified power level in the request. The request is received from one of the network device and the powered device.

Embodiments presented in this disclosure include a method for providing power over Ethernet to a powered device. The method includes receiving a data communication from a network device via a first Ethernet cable coupled to a first Ethernet port of a midspan device. The network device transmits only data to the midspan device. The method includes forwarding the data communication to a powered device using a second Ethernet cable coupled to a second Ethernet port of the midspan device and providing power to the powered device via the second Ethernet cable. The method further includes receiving a request via a communication port of the midspan device where the request specifies a change to a power allocated to the powered device. Moreover, the communication port communicatively couples the midspan device and at least one of the network device and the powered device. The method includes changing the power allocated to the powered device based on a specified power level in the request where the request is received from one of the network device and the powered device.

Embodiments presented in this disclosure include a system for providing power over Ethernet to a powered device. The system includes a power device, a network device, and a midspan device. The midspan device includes a first Ethernet port configured to couple to a first Ethernet cable that couples the midspan device to the network device which transmits only data to the midspan device. The midspan device also includes a second Ethernet port configured to couple to a second Ethernet cable that couples the midspan device to the powered device. The midspan device includes a communication port configured to communicatively couple the midspan device to at least one of the network device and the powered device. The midspan device includes a power supply configured to provide power via the second Ethernet port to the powered device. The power supply is configured to receive a request via the communication port and allocate power to the powered device based on a specified power level in the request. Moreover, the request is received from one of the network device and the powered device.

Description of Example Embodiments

Power over Ethernet (PoE) was standardized in IEEE 802.3af-2003 which provides up to 15.4 W of DC power to each powered device (PD). Devices compatible with this standard are referred to as type 1 devices. The updated IEEE 802.3at-2009 standard (also known as PoE+) provides up to 25.5 W of DC power. In addition, the 802.3at standard provides a method for a PD and power sourcing equipment (PSE) to negotiate power allocation with finer granularity than with the earlier standard. For example, IEEE 802.3af classifies a PD (class 0-3) using the physical layer of an Ethernet cable and provides a power allocation range which defines the minimum and maximum amount of power the PD is permitted to consume. In addition to using the physical layer to determine a power range, devices compatible with IEEE 802.3at (i.e., type 2 devices) may also use layer 2 communication to negotiate power allocation as well as enable other functions. Specifically, IEEE 802.3at established the Link Layer Discovery Protocol (LLDP) for performing power negotiation between PDs and endspan PSEs.

However, midspan PSE devices may be unable to communicate with a PD (or network device) using a layer 2 (data link) communication protocol on the same Ethernet cables that carry data between the network device and PD. Instead, the midspan PSE may be limited to relying on layer 1 (the physical layer) of the Ethernet cables to classify and allocate power to a PD. Accordingly, in one embodiment, a separate communication link is added between a midspan PSE device and PD or network device for enabling data communication. This communication link may be a physically separate link from the Ethernet cables that facilitate data communication between the network device and the PD. Using the communication link provides a communication channel that the midspan PSE device may use to perform the additional features defined in the IEEE 802.3at standard.

For example, a PD may wish to change its current power allocation after the PD as already been discovered and classified by the midspan PSE device. In one embodiment, once the PD is discovered and powered on, the physical layer between the midspan device and PD can no longer be used to alter the power allocated to the PD. Accordingly, instead of using the physical layer, the PD may transmit a request for a different power allocation using LLDP (or any other layer 2 communication protocol) to a network device (i.e., a data-only endspan device that lacks PSE) via the Ethernet cables. The network device may then use the communication link to negotiate a different power allocation with an intelligent midspan PSE—i.e., a midspan device capable of allocating power based on more than only the PD classes established in IEEE 802.3af. Once this negotiation process is complete, a confirmation may be transmitted using LLDP from the network device to the PD with the new power allocation. Although the midspan PSE may use LLDP to negotiate with the network device, this is not a requirement. In another embodiment, the midspan PSE device may use $I^2C$ or RS-2323 serial communication to communicate with the network device. In this manner, a midspan PSE may be used to provide much of the same functionality as type 1 or type 2 endspan PSE devices.

Power Over Ethernet Using a Midspan PSE

Figure 1:
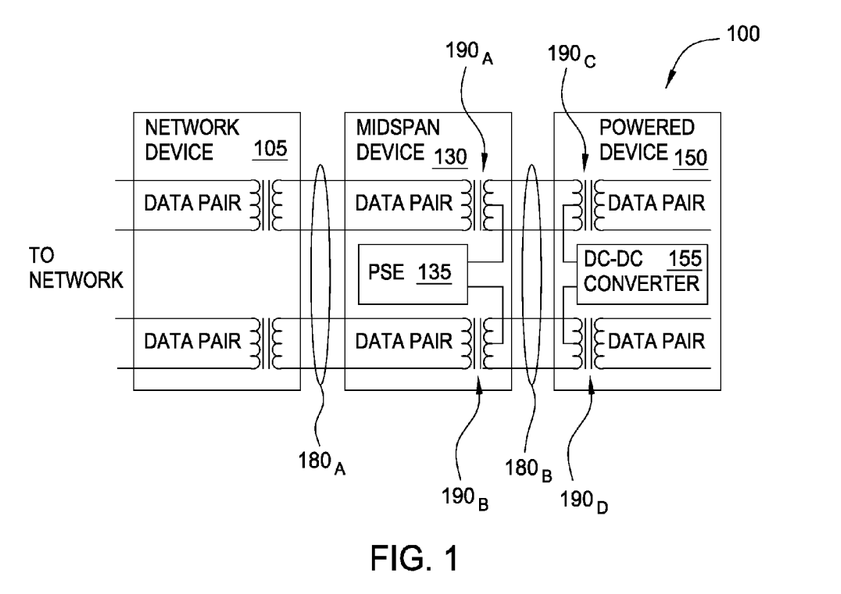
FIG. 1 illustrates a PoE system with a midspan PSE device, according to one embodiment described herein.

FIG. 1 illustrates a PoE system 100 with a midspan PSE device, according to one embodiment described herein. As shown, the PoE system 100 includes a network device 105, midspan device 130, powered device (PD) 150 and at least two Ethernet cables $180_{A-B}$ connecting the devices. The network device 105 routes data communications to and from the powered device 150. For example, the network device 105 may be a gateway device that links the PD 150 to a network (e.g., the Internet). The network device 105 may be a router, switch, server, and the like. However, in one embodiment, the network device 105 is not an endspan PSE (i.e., is a data-only network device). That is, the network device 105 lacks a PSE for providing PoE power on the Ethernet ports of the device 105. Accordingly, the PoE system 100 includes a midspan device 130 for injecting power onto an Ethernet cable $180_B$ that connects the midspan device 130 with the PD 150. Because the midspan device 130 includes PSE 135, the midspan device 130 may properly be characterized as "midspan PSE device" but will be referred to herein simply as midspan device 130.

As shown, the network device 105 uses an Ethernet cable $180_A$ to transmit data pairs (e.g., Ethernet packets or frames) to midspan device 130. The midspan device 130 uses coupling transformers $190_{A-B}$ to transfer (i.e., forward) the data pairs from Ethernet cable $180_A$ to Ethernet cable $180_B$ which then transfers the data pairs to the PD 150. Specifically, the Ethernet cables $180_{A-B}$ include a plurality of conductive wires which may be arranged in twisted pairs for transmitting the data pairs. Although only two twisted pairs are shown, the Ethernet cables $180_{A-B}$ may include more or less than this number. For example, a typical 1000BASE-T compatible Ethernet cable (e.g., category 5) includes four twisted pairs (i.e., eight wires). Each of the twisted pairs is connected to the same physical port on a device—e.g., a RJ45 connector port.

To inject power onto the Ethernet cable $180_B$, the PSE 135 uses the center tap of the coupling transformers $190_{A-B}$ to provide a DC voltage to the PD 150. One of the twisted pairs provides the voltage of the positive rail while the other twisted pair provides the voltage of the negative rail. The DC-DC converter 155 of the PD 150 may use a center tap connection to coupling transformers $190_{C-D}$ to connect to the positive and negative rails. The DC-DC converter 155 may convert the DC voltage to a voltage that corresponds to the needs of the PD 150 and results in power consumption that is within the power range allocated to the PD 150.

In one embodiment, the PSE 135 may inject power on unused twisted pairs (not shown) of Ethernet cable $180_B$. That is, the PSE 135 injects power on twisted pairs that are not transmitting data from the network device 105 to the PD 150. As mentioned previously, a typical Ethernet cable may include four twisted pairs; however, depending on the Ethernet standard used, data pairs may be transmitted on only two of these pairs. The two twisted pairs not transmitting data may be used by the PSE 135 to provide DC power to the PD 150.

When the midspan device 130 is first coupled to the PD 150 via Ethernet cable $180_B$, the two devices may perform a detection stage and a classification stage to determine how much power should be allocated to the PD 150. Typically, the devices use the physical layer (PHY) (i.e., layer 1) of Ethernet cable $180_B$ and the associated hardware/circuits of the midspan device 130 and PD 150 to communicate. In one embodiment, the midspan device 130 does not communicate with the PD 150 using communication methods of layer 2-6 of the open system interconnection (OSI) model. For example, the midspan device 130 cannot use Ethernet cable $180_B$ to transmit data packets or frames to the PD 150. Instead, during the detection stage, the midspan device 130 provides a certain DC voltage to the PD 150 using conductive wires of Ethernet cable $180_B$. The PD 150 responds to this DC voltage by connecting a signature resistor (19-26.5 kilohms (k$\Omega$)) between the positive and negative rails (e.g., the twisted pairs) which results in a DC current that is measured by the PSE 135 on the midspan device 130. Based on the provided DC voltage and the measured DC current, the midspan device 130 determines the resistance value of the PD 150. If the value is between 19-26.5 k$\Omega$, the midspan device 130 determines that the PD 150 is a PoE enabled device.

Following the detection stage, the midspan device 130 provides a classifying DC voltage (which may be different from the DC voltage applied in the detection phase) to which the PD 150 responds by placing a second resistance between the positive and negative rails. By measuring the resulting DC current, the midspan device 130 determines the value of the second resistance and identifies the class of the PD 150. Based on this class, the PSE 135 allocates a particular power range to the PD 150—e.g., a class 1 PD is allocated 0.44-3.84 W. The PD 150 is free to consume any amount of power within the allocated range according to the PD's current needs. In the case of IEEE 802.3at, a second classification stage and a mark stage (both performed using the physical layer of Ethernet cable $180_B$) are provided in order to detect whether the PD 150 is a type 2 device.

Apart from this physical layer communication with the PD 150, in one embodiment, the midspan device 130 may be unable to communicate with the PD 150 using the Ethernet cable $180_B$. Accordingly, the midspan device 130 merely forwards the data communication flowing between the PD 150 and the network device 105 using the coupling transformers $190_{A-B}$ without reading or changing the data. Thus, the PSE 135 on the midspan device 130 and the PD 150 cannot use the twisted pairs of Ethernet cable $180_B$ to transmit data using, for example, LLPD or any other layer 2 communication protocol. To enable some of the features established by IEEE 802.3at, the present disclosure provides the PSE 135 on midspan device 130 with an additional communication channel to either the PD 150 or the network device 105 besides the physical layer of Ethernet cables $180_{A-B}$.

Power Over Ethernet Using an Intelligent Midspan PSE

Figure 2:
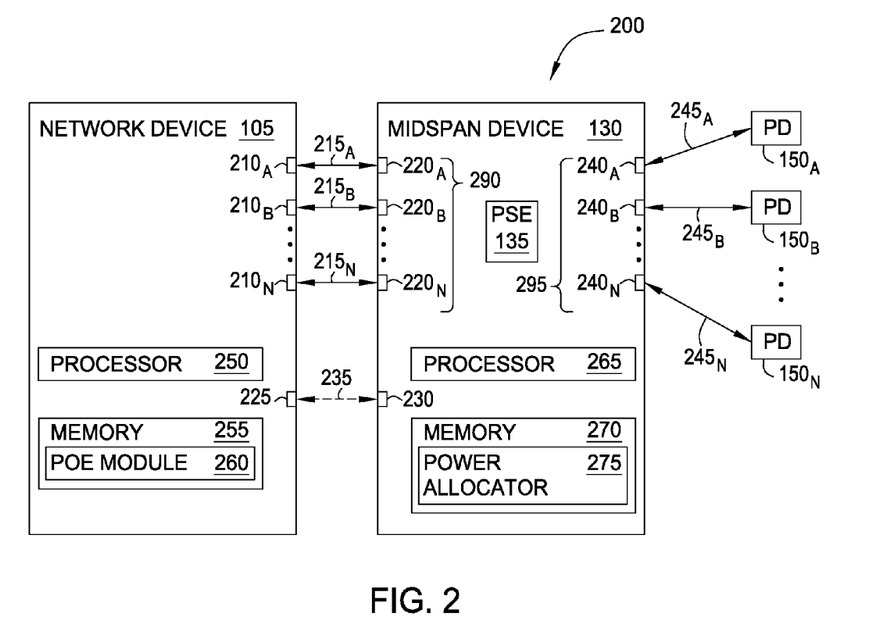
FIG. 2 illustrates a PoE system with an intelligent midspan PSE device, according to one embodiment described herein.

FIG. 2 illustrates a PoE system 200 with an intelligent midspan PSE device, according to one embodiment described herein. As shown, the midspan device 130 connects a plurality of PDs $150_{A-N}$ via a plurality of Ethernet cables $245_{A-N}$. Specifically, the level of detail shown in FIG. 1—i.e., the twisted pairs in a single Ethernet cable—has been abstracted to show only the different cables $245_{A-N}$ that may contain a plurality of twisted pairs. As discussed above, the PSE 135 may use the Ethernet ports $240_{A-N}$ (e.g., RJ45 receptacles) and cables $245_{A-N}$ to detect, classify, and allocate power to the plurality of PDs $150_{A-N}$. The ports $240_{A-N}$ make up a PD interface 295 of the midspan device 130.

The midspan device 130 may also include a network device interface 290 made up of Ethernet ports $220_{A-N}$. These ports $220_{A-N}$ are coupled to Ethernet ports $210_{A-N}$ of the network device 105 via Ethernet cables $215_{A-N}$. In one embodiment, for every port 220 on the network device interface 290 coupled to a port 210 of the network device 105, the PD interface 295 may have a corresponding port 240 coupled to a PD 150. Accordingly, each port 210 on the network device 105 may correspond to a respective PD 150. For example, as the midspan device 130 receives data pairs on port $220_A$, the midspan device 130 forwards the data pairs on port $240_A$ to PD $150_A$. Data received on port $220_B$ may be forwarded to PD $150_B$, and so forth.

In addition to forwarding the data pairs, the PSE 135 may inject power onto each Ethernet cable $245_{A-N}$. However, each PD 150 may be allocated a different amount of power based on, for example, the class of the PD 150. Furthermore, in one embodiment, the midspan device 130 may be coupled, using Ethernet cables 245, to a device that is not PoE enabled. Or the midspan device 130 may not be currently providing power to a device that is PoE enabled. In either case, the midspan device 130 may still forward data from the network device 105 to the non-powered device without injecting DC power onto the associated Ethernet cable 245.

Additionally, network device 105 and midspan device 130 share a different communication link apart from the Ethernet cables 215 that carry data intended for the PDs 150. This communication link may transmit data from the network device 105 where the ultimate destination for the data is the midspan device 130 rather than the PDs 150. Specifically, the communication link includes port 225, conductive wire 235 and port 230. Using this communication link, the network device 105 and midspan device 130 may communicate to enable additional PoE features that were established in IEEE 802.3at (or future PoE standards). Examples of these features are provided below.

In one embodiment, the communication link uses $I^2C$ or RS 232 serial communication in order to transmit information between the network device 105 and midspan device 130. Alternatively, the communication link may be a separate Ethernet communication link where ports 225 and 230 are Ethernet ports and conductive wire 235 is in an Ethernet cable. Further still, the communication link may be wireless. In this case, the ports 225 and 230 may be wireless adapters while the conductive wire 235 is replaced by a wireless signal. Regardless of the communication medium used, the devices 130, 105 may use any of the layers of the OSI model (e.g., physical layer or layer 2) to communicate.

Network device 105 contains a processor 250 and memory 255. The processor 250 may be a microprocessor, a multi-core processor or represent a plurality of different processors. Memory 255 may be either volatile or non-volatile memory and include, RAM, flash, cache, disk drives and the like. Memory 255 includes a PoE module 260 which initiates or responds to communications from midspan device 130 via the communication link. For example, the PoE module 260 may receive a request from one of the PDs 150 to change the PD's power allocation. The PoE module 260 may then forward that request via the conductive wire 235 to the midspan device 130. In one embodiment, before forwarding the request, the PoE module 260 may interpret and modify the request before relaying the request to the midspan device 130. For example, the PoE module 260 may complete the negotiation with the PD 150 and then instruct the midspan device 130 of any changes after the negotiation is complete.

The PoE module 260 may be placed in memory 255 as a result of a software or firmware update. For example, the network device 105 may have been, when original manufactured, unable to provide PoE power to attached PDs. Instead of replacing the network device 105 with a network device that includes a PSE (i.e., an endspan PSE) the software or firmware may be updated such that the PoE module 260 is installed on the device 105. Moreover, an unused Ethernet port 225 may be used as part of the communication channel in order to facilitate communication with the midspan device 130. Thus, network device 105 may be configured to work in tandem with the midspan device 130 to enable many of the features of newer PoE standards without having to purchase a new network device that is compatible with the latest PoE standard.

The midspan device 130 contains a processor 265 and memory 270. The processor 265 may be a microprocessor, a multi-core processor or represent a plurality of different processors. Memory 270 may be either volatile or non-volatile memory and include, RAM, flash, cache, disk drives and the like. Memory 270 includes a power allocator 275 which controls the PSE 135. For example, the power allocator 275 may record how much power is allocated to each PD $150_{A-N}$. As a PD 150 is disconnected, the power allocator 275 may note that additional power is available. Conversely, when a new PD 150 is connected to the midspan device 130, the power allocator 275 may compare the requested power allocation to the maximum amount of power the PSE 135 can provide. If granting the power allocation would exceed the capabilities of the PSE 135 (i.e., exceed the power supply's rating) the power allocator 275 may deny the request.

Much like the PoE module 260, the power allocator 275 may be installed on the midspan device 130 during a software or firmware update. Alternatively, because older midspan device 130 may not have the specialized port 230—i.e., a port that permits the midspan device 130 to communicate bidirectionally with the network device 105—a new midspan device 130 with the power allocator 275 and specialized port 230 may be purchased. Thus, to enable an older PoE system to provide the additional features defined by a new PoE standard, the network device 105 may be updated to include the PoE module 260 and a midspan device 130 with port 230 and the power allocator 275 may be purchased. This option may be cheaper than purchasing a new router or switch that includes an endspan PSE compatible with a newer PoE standard—e.g., IEEE 802.3at.

In another embodiment, the PoE module 260 on the network device 105 may perform some or all of the functions of the power allocator 275. That is, the PoE module 260 may record how much power is allocated to each PD $150_{A-N}$ and ensure that granting a request from a PD 150 would not exceed the capabilities of the PSE 135 on the midspan device 130. Thus, a PD 150 and the network device 105 may negotiate a new power allocation without involving the midspan device 130. Once the new power level is determined, the PoE module 260 may transmit the new power level to the PSE 135 on the midspan device 130.

Figure 3:
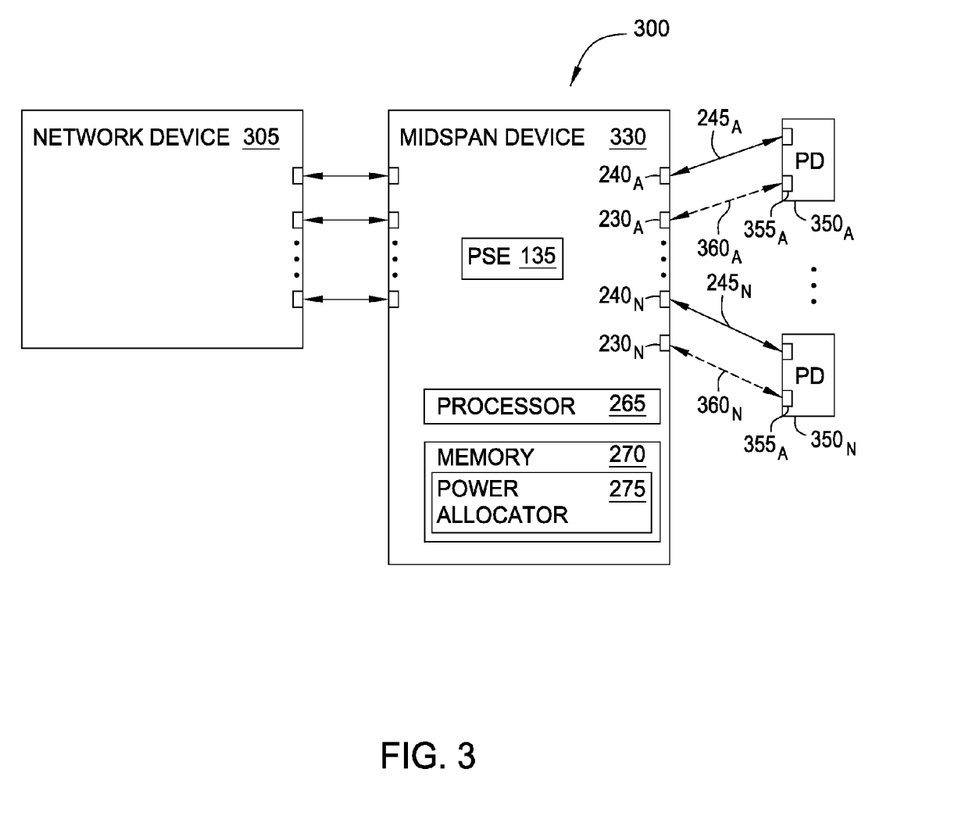
FIG. 3 illustrates a PoE system with an intelligent midspan PSE device, according to one embodiment described herein.

FIG. 3 illustrates a PoE system 300 with an intelligent midspan PSE device, according to one embodiment described herein. In contrast to FIG. 2, here the midspan device 330 may have a plurality of dedicated ports $230_{A-N}$ for communicating directly with the PD 350. Thus, instead of using the network device 305 to negotiate power allocation, the midspan device 330 may receive requests directly from the PDs 350. Because in one embodiment the midspan device 130 is unable to use Ethernet cables 245 to communicate with the PDs 350 (except for the physical layer) each PD 350 may have a second port 355 that corresponds to one of the ports 230. Each of the second ports $355_{A-N}$ and ports $230_{A-N}$ may be communicatively coupled by conductive wires $360_{A-N}$. Like in the PoE system 200 of FIG. 2, the communication link here (i.e., port 230, conductive wire 360, and second port 355) may use I²C, RS-232 serial communication, an independent Ethernet link, wireless, and the like to transmit data between the midspan device 330 and a PD 350.

Although not shown, each PD 350 may include a processor and memory which contains a PoE module for communicating with the power allocator 275 to enable additional features. Moreover, to limit the number of additional ports $230_{A-N}$, not every Ethernet port 240 may have a corresponding port 230. Accordingly, a system administrator may select which of the PDs 350 to connect to a dedicated port 230. These selected PDs 350 would then be able to communicate directly with the power allocator 275 in the midspan device 330.

In one embodiment, midspan device 330 may be coupled to at least one PD 350 as well as the network device 305. That is, the midspan device 130 may have at least two dedicated ports 230: one for communicating with a PoE module on the network device 305 and one for communicating with a PoE module on a PD 350. Moreover, instead of a connecting the midspan device to a network device or a PD, the midspan device may be connected to a different computing device that is communicatively coupled to a PD receiving power from the midspan device.

Features Provided by an Intelligent Midspan PSE

Figure 4:
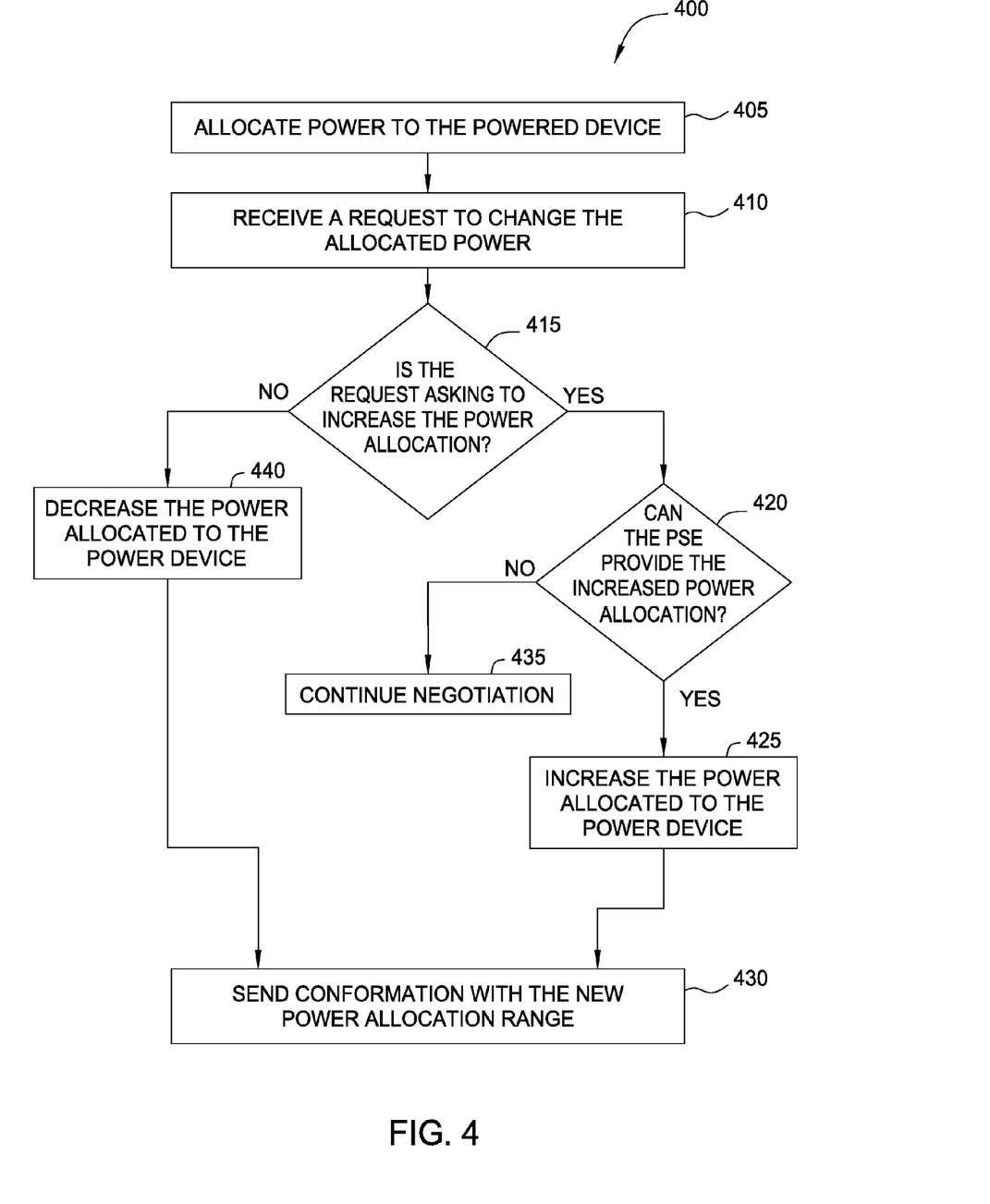
FIG. 4 illustrates a method of allocating power using an intelligent midspan PSE device, according to one embodiment described herein.

FIG. 4 illustrates a method 400 of allocating power using an intelligent midspan PSE device, according to one embodiment described herein. For method 400, the PoE module may be located on the network device 105 shown in FIG. 2 or on the PD 350 shown in FIG. 3. For convenience, it is assumed that the PoE module is located on the network device 105.

During detection and classification stages (step 405) the PSE 135 may allocate an initial power to the PD 150. As discussed earlier, this process uses the physical layer to determine a class of the PD 150 which corresponds to a particular power range. For example, a class 1 PD may be allocated a power range of 0.44-3.84 W. However, the PD 150 may determine that it will never need to consume more than a certain amount of DC power—e.g., the PD 150 could be allocated 0.44-2 W rather than 0.44-3.84 W. Advantageously, if the PSE 135 allocates less power to the PD 150, this frees up power which may be allocated to a different PD 150. Regardless if the PD 150 desires a greater or smaller power allotment, at step 410, the PD 150 may transmit a request using the Ethernet cables $245_A$ and $215_A$ to the PoE module 260 of network device 105 to change the PD's 150 power allotment.

Specifically, the PD 150 may transmit the request on the Ethernet cables $245_A$ and $215_A$ using LLDP. Because the midspan device 130 may be configured to merely forward (i.e., not to read or interpret) the data transmitted though the PD interface 290 and network device interface 295, the PoE module 260 forwards the request to the midspan device 130 via the communication link—i.e., port 225, wire 235 and port 230. This may require the PoE module 260 to convert the layer 2 LLDP request to the protocol used by the communication link—e.g., I²C.

At step 415, the power allocator 275 determines whether the requested change in power allocation is to increase or decrease the current allocated power level. If the PD 150 requests a decreased power allotment—e.g., from a maximum of 3.84 W to a maximum 2 W—at step 440 the power allocator 275 may decrease the power allocated to the PD 150. In one embodiment, if the PD 150 requests a reduced range with a lower maximum power level, the PD 150 may begin to consume power within the new range (e.g., begin to consume less power) before receiving a confirmation message from the power allocator 275.

At step 430, the power allocator 275 may prepare a confirmation message which includes the new allocated power range and transmit the confirmation back to the PoE module 260 using the communication link. The PoE module 260 may convert the confirmation message to be compatible with LLDP and use, for example, Ethernet cables $215_A$ and $245_A$ to transmit the confirmation message back to PD $150_A$. The new allocated power range dictates how much power PD $150_A$ may consume. Thus, if the needs of PD $150_A$ changes, PD $150_A$ may have to send a new request to the midspan device 130 before PD $150_A$ may consume power outside of the new range.

Allocating power may require the power allocator 275 to update a power allocation table stored in memory 270. The table may record the power ranges allocated to each PD 150. As these ranges change, the power allocator 275 amends the table to represent the current power allocation. Additionally, the power allocator 275 may access the table when determining whether a requested power allocation from a PD 150 would exceed the capabilities of the PSE 135.

If the PD 150 requests an increased power allocation—i.e., a greater maximum amount of power consumption—at step 420 the power allocator 275 may determine if the PSE 135 can provide the increased power allocation. For example, the power allocator 275 may record and track the power currently allotted to all the PDs 150 connected to the midspan device 130. The power allocator 275 ensures that the combined power allocations of all the PDs 150 does not exceed the maximum amount of power that can be provided by the PSE 135. Even if the power allocator 275 has allocated to the PDs 150 the maximum amount of power that the PSE 135 can provide, the PSE 135 may not currently be providing the maximum amount of power to the PDs 150. For example, a PD 150 may be allocated up to 12.94 W but is currently consuming only 4 W. Nonetheless, the power allocator 275 continues to allocate 12.94 W to that PD 150 in case the PD 150 suddenly begins to draw the maximum amount of power allocated to it. In this manner, the power allocator 275 ensures that even in the worst case scenario—i.e., each connected PD consumes the maximum amount of power allocated to it—the PSE 135 is able to satisfy the demands of the PDs 150. Thus, even if a PD 150 requests a new power allocation that the PSE 135 could currently satisfy because one or more of the PDs 150 are not currently consuming the maximum amount of power allocated to them, the power allocator 275 may deny the request (step 435).

Alternatively, instead of simply denying the request, the power allocator 275 may negotiate with the PoE module 260 or with the PD 150 to allocate a power that is less than the amount originally requested by the PD 150 but within the limits of the PSE 135. For example, the power allocator 275 may transmit a counteroffer to the PD 150 via the PoE module 260. This counteroffer may be the difference between the maximum amount of power the PSE 135 can provide and the total amount of power allocated to all the PDs 150. The PD 150 may choose to accept or reject the counteroffer. For example, if the PD 150 needs to consume more power than the counteroffer provides, the PD 150 may reject the counteroffer so that another PD 150 may use that power. The PD 150 could then try to get the requisite amount of power at a later time. If the counteroffer does provide enough power, the PD 150 may use the PoE module 260 to inform the power allocator 275 that the PD 150 has accepted the counteroffer. The power allocator 275 then allocates that power to the PD 150 and may send a confirmation message back to the PD 150 via the PoE module 260.

Alternatively, if the power allocator 275 cannot allot to the PD 150 all of the power it requested, the power allocator 275 may immediately increase the power allocated to the PD 150 by the difference between the maximum amount of power the PSE 135 can provide and the total amount of power allocated to all the PDs 150. This avoids having to send the counteroffer and acceptance messages discussed above. Regardless of the method used, the power allocated to the PD 150 may be adjusted with finer granularity than relying only on the classes established by IEEE 802.3af.

If the power allocator 275 is able to provide the requested increase in power allocation, at step 425 the power allocator 275 changes the power allocated to the PD 150 based on the request. For example, the power allocator 275 may update an entry for the selected PD 150 in a power allocation table stored in memory 270. At step 430, the power allocator 275 transmits a confirmation message to the PD 150 that includes the current power range allocated to the PD 150. Because the power allocator 275 may be unable to change the power requested by the PD 150, the power range allocated in the confirmation message may be the same range assigned to the PD 150 before the PD 150 requested a change to its power allocation.

Figure 5:
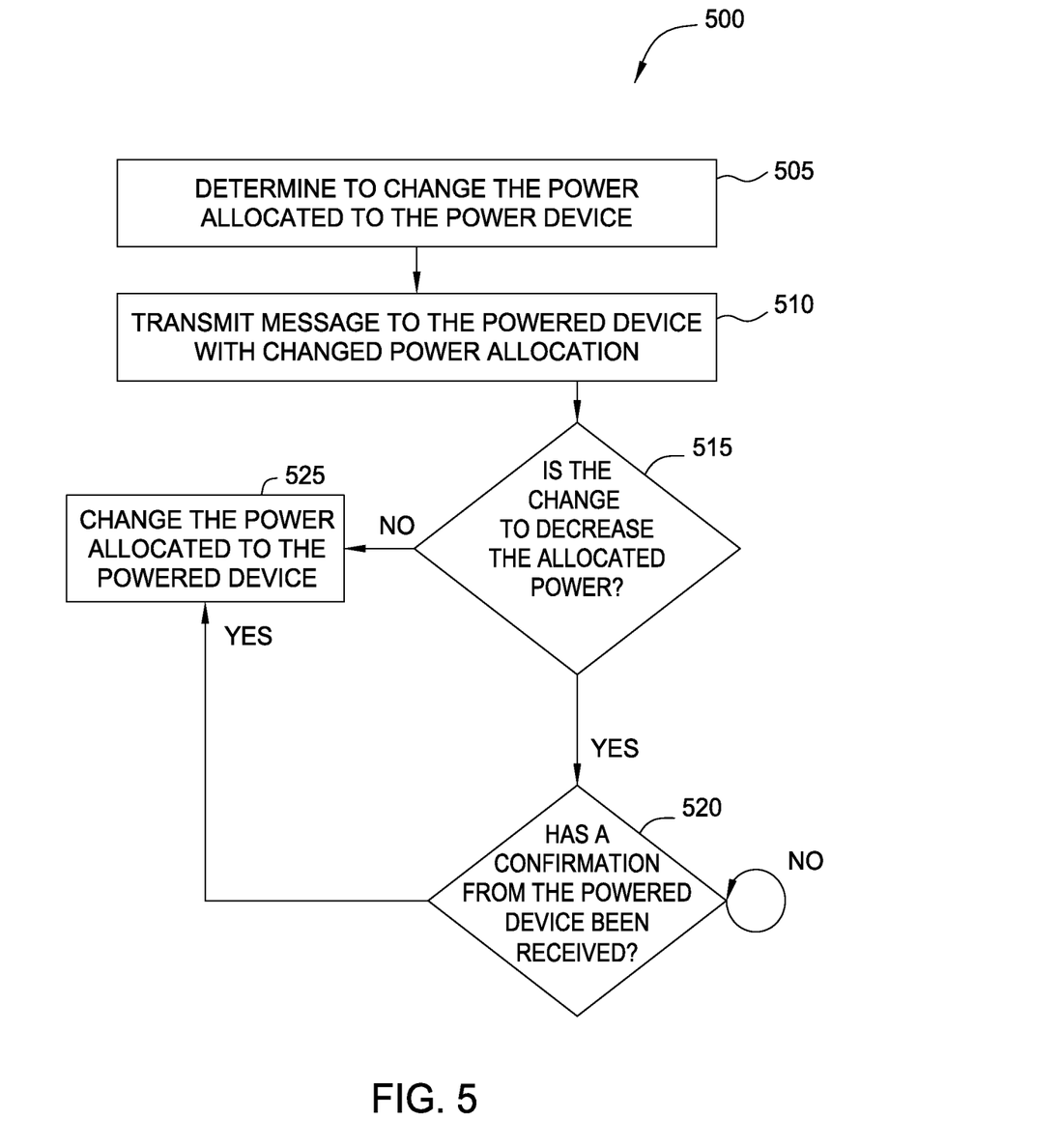
FIG. 5 illustrates a method of allocating power using an intelligent midspan PSE device, according to one embodiment described herein.

FIG. 5 illustrates a method 500 of allocating power using an intelligent midspan PSE device, according to one embodiment described herein. At step 505, the power allocator 275 may determine to change the power allocated to one of the PDs 150 connected to the midspan device 130. For example, the PSE 135 may be overheating, and in order to allow the PSE 135 to cool, the power allocator 275 may request that the PDs 150 consume power within a power allocation range that has a lower maximum power level.

In another embodiment, the PDs 150 may be prioritized. The power allocator 275 may receive a request from a high priority PD 150 for an increased power allocation as described in method 400 of FIG. 4. If the request would result in the combination of the power ranges allocated to the PDs 150 exceeding the maximum power output of the PSE 135, instead of denying the request or negotiating with the high priority PD 150, the power allocator 275 may instead instruct one or more lower priority PDs 150 to reduce their power allocation. Similarly, if a PD 150 previously requested an increased power allocation but was denied by the power allocator 275, the power allocator 275 may store the request in memory 270. Once power becomes available, the power allocator 275 may allocate the available power based on, for example, first in-first out prioritization. Thus, the power allocator 275 satisfies the requests in the order they were received.

In another embodiment, the power allocator 275 may detect a new PD 150 and determine that the PSE 135 does not have enough available power to power on the PD 150. Instead of leaving the PD 150 completely unpowered, the power allocator 275 may request that one or more already powered PDs 150 reduce their power allocation ranges to free enough power such that the new PD 150 is allocated sufficient power to at least power on, even if the power allocation is less than the power allocation range the new PD 150 originally requested.

Regardless of the reason for changing the power allocation of one or more PDs 150, before transmitting a message to a PD 150, the power allocator 275 may determine whether the change in power allocation may exceed the capabilities of the PSE 135 as discussed in step 420 of method 400.

At step 510, the power allocator 275 transmits a message to the PD 150 instructing the PD 150 to operate within the range specified in the message. For example, the power allocator 275 may transmit the message using I$^2$C in the communication link between the midspan device 130 and the network device 105. The PoE module 260 may then transmit a LLPD packet containing this information to the PD 150 using Ethernet cables 215 and 245.

In one embodiment, a PoE module on the PD 150 may be used to negotiate with the power allocator 275. For example, the power allocator 275 may transmit a general request to the PD 150 to reduce its power allocation but may not specify the actual power allocation range. The PD 150 may then determine an acceptable power allocation range that is less than its current power allocation (i.e., reduce the maximum power level) and transmit a message back to the power allocator 275 on the midspan device 130.

At step 515, the power allocator 275 may determine whether the change in power allocation increases or decreases the power allocated to a particular PD 150. If the power allocator 275 chooses to increase the power allocated to a PD 150, at step 525 the power allocator 275 may allocate the power to the powered device as discussed in step 425 of method 400. In one embodiment, the power allocator 275 may increase power allocation to a PD 150 before receiving a confirmation message from the PD 150. The confirmation functions as an indicator to inform the power allocator 275 that the PD 150 is currently consuming power within the allocated power range. But because the power allocator 275 is increasing the maximum power allocated to the PD 150 and has already determined the increased power allocation does not exceed the capabilities of the PSE 135, the power allocator 275 may increase the power allocation before receiving the confirmation message. Thus, the power allocator 275 may begin to make other adjustments based on the update power allocation even before the confirmation from the PD 150 is received.

If the power allocator 275 chooses to decrease the power allocated to a PD 150, at step 520 the power allocator 275 determines whether a confirmation from the PD 150 has been received. If not, in one embodiment, the power allocator 275 waits at step 520 until the confirmation message is received before decreasing the power allocated to the PD 150. If the power allocator 275 did not wait for the confirmation message, the capabilities of the PSE 135 may be exceeded. For example, assume power allocator 275 instructs PD 1 to reduce its maximum power consumption from 12.5 W to 10 W and sends a message to PD 2 informing it that it can now consume an additional 2.5 W. However, if the message from power allocator 275 to PD 1 was lost, PD 1 may continue to consume up to 12.5 W. If PD 2 also increases the power its consuming based on the new allotment, then power allocator 275 can no longer ensure that the power being consumed by the PDs does not exceed the maximum capabilities of the PSE 135. Assuming that the power allocator 275 has assigned all of the available power of PSE 135 and the PDs are currently consuming the maximum allocated power, the capabilities of PSE 135 would be exceeded by 2.5 W.

Once the confirmation message is received, at step 525 the power allocator 275 decreases the power allocated to the PD 150. This allocation provides additional power that may be allocated to other PDs 150 connected to the midspan device 130, reserved for newly added PDs 150, used for high priority PDs 150, and the like.

Although method 500 was described from the perspective of the power allocator 275, the same functionality may be achieved by the PoE module 260 on the network device 105. That is, at step 505, either the power allocator 275 or the PoE module 260 may determine to change the power range allocated to a PD 150, disable or enable PoE for a PD 150, management PoE based on priority, and the like. For example, instead of the power allocator 275 tracking the amount of power allocated to each of the PDs 150, the PoE module 260 may store in local memory 255 the power allocation table and perform method 500 as described in steps 510-525.

In one embodiment, the PoE module 260 and the power allocator 275 may switch the PDs 150 connected to the midspan device 130 into a low power mode. Determining whether to reduce the power allocated to a PD 150 may be based on, for example, the time of day or a time period during which the PD 150 is idle. Typical midspan devices (such as the midspan 130 described above with respect to FIG. 1) provide a voltage potential across the twisted pairs of an Ethernet cable so long as the PD 150 maintains a minimum current flowing between the negative and positive rails. If the current measured by the PSE 135 is less than the minimum current (e.g., 10 mA) the PSE 135 assumes the cable has been disconnected and stops supplying a voltage on the cable to prevent electrocution or short circuits. However, requiring a minimum amount of current may be wasteful. Accordingly, the PDs 150 may be switched into a low power state. Once the PoE module 260, power allocator 275, or a PoE module on the PD 150 determines to switch the PD 150 into a low power state, a message is transmitted which instructs the PSE 135 to continue to provide voltage on a selected Ethernet cable even if the measured current falls below the minimum current. If desired, the PoE module 260 may send a message to the PD 150 connected to the selected Ethernet cable instructing the PD 150 that it no longer must provide a minimum current between the negative and positive rails to continue to receive a voltage supply from the midspan device 130.

Because the midspan device 130 and the PD 150 may be unable to communicate directly using level 2 (or greater) communication via the Ethernet cables 245, the PoE module 260 may instead send low-power discovery packets intermittently to the PD 150. That is, the PD 150 may draw only enough power from the positive and negative rails to enable the PD 150 to respond to the PoE module's discovery packets. This power consumption may be less than the power consumed when providing the minimum current level. If the PD 150 responds, then the PoE module 260 knows that the PD 150 is still connected. However, if the PD 150 fails to respond, the PoE module 260 may determine the PD 150 has been disconnected from the Ethernet cable then send a message to the power allocator 275 along wire 235 instructing the PSE 135 to stop supplying voltage on the cable.

CONCLUSION

Midspan PSE devices may be unable to communicate with a PD or a network device using layer 2 communication protocol (e.g., LLDP) on the same Ethernet cables that carry data between the network device and PD. In one embodiment, a separate communication link is added between a midspan PSE device and network device (or between the midspan device and the PD) for enabling data communication. Specifically, this communication link is physically separate from the Ethernet cables that facilitate data communication between the network device and a PD. Using the communication link provides a communication channel that the midspan PSE device may use to perform the additional functions defined in the IEEE 802.3at standard.

For example, if a PD wishes to change its current power allocation after the PD has already been discovered and classified by the midspan PSE device, instead of using the physical layer, the PD may transmit a request for a different power allocation using LLDP. The network device may then use the communication link to negotiate a changed power allocation with the midspan PSE device. Once this process is complete, a confirmation may be transmitted using LLDP from the network device to the PD with the new power allocation. In this manner, a midspan PSE may be used to provide much of the same functionality as a type 2 endspan PSE.

While the previous discussion is directed to embodiments of the present disclosure, other and further embodiments of the disclosure may be devised without departing from the basic scope thereof. For example, aspects of the present disclosure may be implemented in hardware or software or in a combination of hardware and software. One embodiment of the disclosure may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present disclosure, are embodiments of the present disclosure.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A midspan device, comprising:
a first Ethernet port configured to couple to a first Ethernet cable, the first Ethernet cable coupling the midspan device to a network device, wherein the network device transmits only data to the midspan device;
a second Ethernet port configured to couple to a second Ethernet cable, the second Ethernet cable coupling the midspan device to a powered device;
a communication port configured to communicatively couple the midspan device to at least one of the network device and the powered device; and
a power supply configured to provide power via the second Ethernet port to the powered device, the power supply configured to receive a request via the communication port and allocate power to the powered device based on a specified power level in the request, wherein the request is received from one of the network device and the powered device.

2. The midspan device of claim 1, wherein the communication port is a different port from the first and second Ethernet ports.

3. The midspan device of claim 1, wherein the network device routes data communications to the powered device, and from the powered device, in a network.

4. The midspan device of claim 1, wherein the communication port is coupled to a wire, and wherein the communication port is one of: an $I^2C$ port, a RS-232 serial port, and a third Ethernet port.

5. The midspan device of claim 1, wherein the communication port is communicatively coupled to the network device, wherein the network device transmits the request to change a power allocated by a power allocator to the powered device.

6. The midspan device of claim 5, wherein, the request is transmitted in response to the network device receiving a power change message from the powered device via the first and second Ethernet cables, the power change message specifying a requested power allocation for the powered device.

7. The midspan device of claim 1, wherein the network device transmits the request to change a power allocated to the powered device based on a time of day.

8. A method, comprising:
receiving a data communication from a network device via a first Ethernet cable coupled to a first Ethernet port of a midspan device, wherein the network device transmits only data to the midspan device;
forwarding the data communication to a powered device using a second Ethernet cable coupled to a second Ethernet port of the midspan device;
providing power to the powered device via the second Ethernet cable;
receiving a request via a communication port of the midspan device, the request specifying a change to a power allocated to the powered device, wherein the communication port communicatively couples the midspan device to at least one of the network device and the powered device; and
changing the power allocated to the powered device based on a specified power level in the request, wherein the request is received from one of the network device and the powered device.

9. The method of claim 8, wherein the communication port is a different port from the first and second Ethernet ports.

10. The method of claim 8, wherein the network device routes data communications to the powered device, and from the powered device, in a network.

11. The method of claim 8, wherein the communication port is coupled to a wire, and wherein the communication port is one of: an $I^2C$ port, a RS-232 serial port, and a third Ethernet port.

12. The method of claim 8, wherein the communication port is communicatively coupled to the network device, wherein the midspan device receives the request to change a power allocated from the network device.

13. The method of claim 12, wherein, the request is transmitted in response to the network device receiving a communication from the powered device via the first and second Ethernet cables, the communication specifying a requested power allocation for the powered device.

14. The method of claim 12, further comprising:
transmitting a confirmation via the communication port to the network device, the confirmation specifying the power allocated to the powered device based on the received request; and
in response to receiving the confirmation, forwarding the confirmation to the powered device using the first and second Ethernet cables.

15. The method of claim 8, wherein the network device does not contain power source equipment for providing power over Ethernet.

16. A system, comprising:
a powered device;
a network device; and
a midspan device comprising:
a first Ethernet port configured to couple to a first Ethernet cable, the first Ethernet cable coupling the midspan device to the network device, wherein the network device transmits only data to the midspan device;
a second Ethernet port configured to couple to a second Ethernet cable, the second Ethernet cable coupling the midspan device to the powered device;
a communication port configured to couple to a wire, the wire coupling the midspan device to at least one of the network device and the powered device; and
a power supply configured to provide power via the second Ethernet port to the powered device, the power supply configured to receive a request via the communication port and allocate power to the powered device based on a specified power level in the request, wherein the request is received from one of the network device and the powered device.

17. The system of claim 16, wherein the network device further comprises a Power over Ethernet module configured to receive power messages from the powered device using a first communication protocol and transmitting the request to the midspan device using a different, second communication protocol.

18. The system of claim 16, wherein the network device further comprises a Power over Ethernet module that transmits the request to the midspan device based on the time of day.

19. The system of claim 16, wherein the midspan device is configured to, after allocating power to the powered device based on the power level in the request, transmit a confirmation message to one of the network device and powered device.

20. The system of claim 16, wherein the network device routes data communications to the powered device, and from the powered device, in a network.

21. The system of claim 16, wherein the communication port is a different port from the first and second Ethernet ports.

22. The system of claim 16, wherein the network device does not contain power source equipment for providing power over Ethernet.

23. The midspan device of claim 1, further comprising logic configured to directly communicate with at least one of the network device and the powered device to negotiate power allocated for the powered device.

* * * * *